UNITED STATES PATENT OFFICE.

FRANK LAYTON GRIER AND GARRETT LAYTON GRIER, OF MILFORD, DELAWARE.

DENTAL CEMENT AND PROCESS FOR MANUFACTURING THE SAME.

No. 889,009.     Specification of Letters Patent.     Patented May 26, 1908.

Application filed September 4, 1907. Serial No. 391,313.

*To all whom it may concern:*

Be it known that we, FRANK L. GRIER and GARRETT L. GRIER, citizens of the United States, and residents of Milford, in the county of Sussex and State of Delaware, have invented an Improved Dental Cement and Process for Manufacturing the Same, of which the following is a specification.

Our invention relates to the manufacture of a translucent cement for dental fillings, and consists in mixing solutions of phosphoric acids or a combination of said acids holding in solution certain modifying salts, with compounds of thorium and titanium capable of chemical combination with the same. Thorium is a rare mineral, the salts of which have never before been used in making a dental cement, but are possessed of valuable properties for this purpose. The cement thus obtained is extremely hard, of very dense texture and in addition to a marked translucency combined with pearl-like luster, is susceptible of a high degree of polish which is lasting and more perceptible under the influence of moisture, rendering it of particular beauty for the purposes intended.

The material obtained by our process closely resembles the human teeth in color, and also in its resistance to chemical change through any action of the normal secretions occurring in the oral cavity, and as in process of manufacture it may be given any desired shade through fusing with certain oxids including titanium, uranium, and other metallic oxids possessed of coloring power when fused with silicious compounds, it particularly adapts itself to be used as a filling or plugging for teeth, and when properly inserted by the dentist is indistinguishable in color and texture from the tooth or teeth in which it is placed.

In the manufacture of dental cements of this character, certain precipitated silicates have been used in combination with a base of silica fused with lime, alumina, etc., but these cements have also been adapted to mending pearls, porcelain, etc., and show either contraction, expansion, solubility, or a lack of strength in varying degrees, such as to render their use unsatisfactory in long tests for dental purposes, and in addition to these mechanical or physical defects, some compounds manifest a tendency to change color through chemical action brought about by secretions present in the mouth. The cement prepared by our process and ready for convenient use by the dental operator, avoids these troubles, as it is prepared and adapted for dental use only. It has, through the peculiar action of the thorium compound, strength, luster, and insolubility, and as thoria is not discolored by action of contents of the oral cavity including hydrogen sulfid, which latter discolors most chemical compounds, it retains color and tooth-like luster.

The thorium compounds as used in our process give strength, density, a tooth-like appearance, and lasting qualities in the presence of dilute acids or alkalies not obtained by any other compound of like nature, in addition to which it shows remarkable stability of form as regards expansion or contraction.

The silicate or thorium used in this process may be prepared by precipitating a solution of nitrate of thorium or other soluble acid salt of same, by means of a solution of an alkali silicate such as sodium or potassium silicates, carefully washing the precipitate, drying at moderate heat and finally bringing to incipient fusion; this treatment resulting in the production of a silicate corresponding in formula with $ThO_2SiO_2$, or $ThSiO_4$. This product is ground and bolted with a base composed of silica, lime, alumina, and titanic acid, ($TiO_2$), the latter adding greatly to strength and non-penetrability of the finished cement. The above mentioned materials are mixed with small amount of $Na_2CO_3$ in such proportions that upon fusion they form a highly refractory glass. This is treated while still hot to remove any soluble matter, and afterward ground with the thorium silicate as described before. The proportions used, which may be varied to obtain certain results, are 8 parts of the base to 2 parts of the thorium compound.

The solid pulverulent body of the cement as thus described, is incorporated with phosphoric acid, or its acid salts in the usual way of admixture and quickly sets into a lasting coherent mass. Instead of using the phosphoric acid alone, it may be modified by the addition of other ingredients such as zinc and aluminum salts.

We claim:

1. A process for manufacturing a material especially adapted for use as a translucent dental cement, which consists in combining a thorium compound insoluble in water but capable of chemical reactions with phosphoric acid, with a fused and finely ground base consisting of silica, lime, alumina, and titanic oxid, and with phosphoric acid or acid phosphates in solution, substantially as herein set forth.

2. The process for producing a translucent dental cement, which consists in preparing from its solutions, a thorium silicate and combining the same with a base containing titanium oxid.

3. A process for producing a translucent dental cement, which consists in combining a thorium compound with a solution of phosphoric acid, or a solution of phosphoric acid modified by the addition of certain soluble salts of zinc, and aluminum.

4. As a new article of manufacture, a translucent dental cement or filling composed of a thorium compound in conjunction with a base consisting of silica, lime, alumina, and titanic oxid, in combination with solutions of phosphoric acid substantially as herein set forth.

5. A new article of manufacture for forming a translucent dental cement, consisting of a composition of matter containing a thorium compound adapted to have a setting reaction with phosphoric acid.

FRANK LAYTON GRIER.
GARRETT LAYTON GRIER.

Witnesses:
S. EDGAR MAHAN,
J. D. POSTLER.